A. WILLIAMS.
Hand Seeder.
No. 66,196. Patented June 25, 1867.
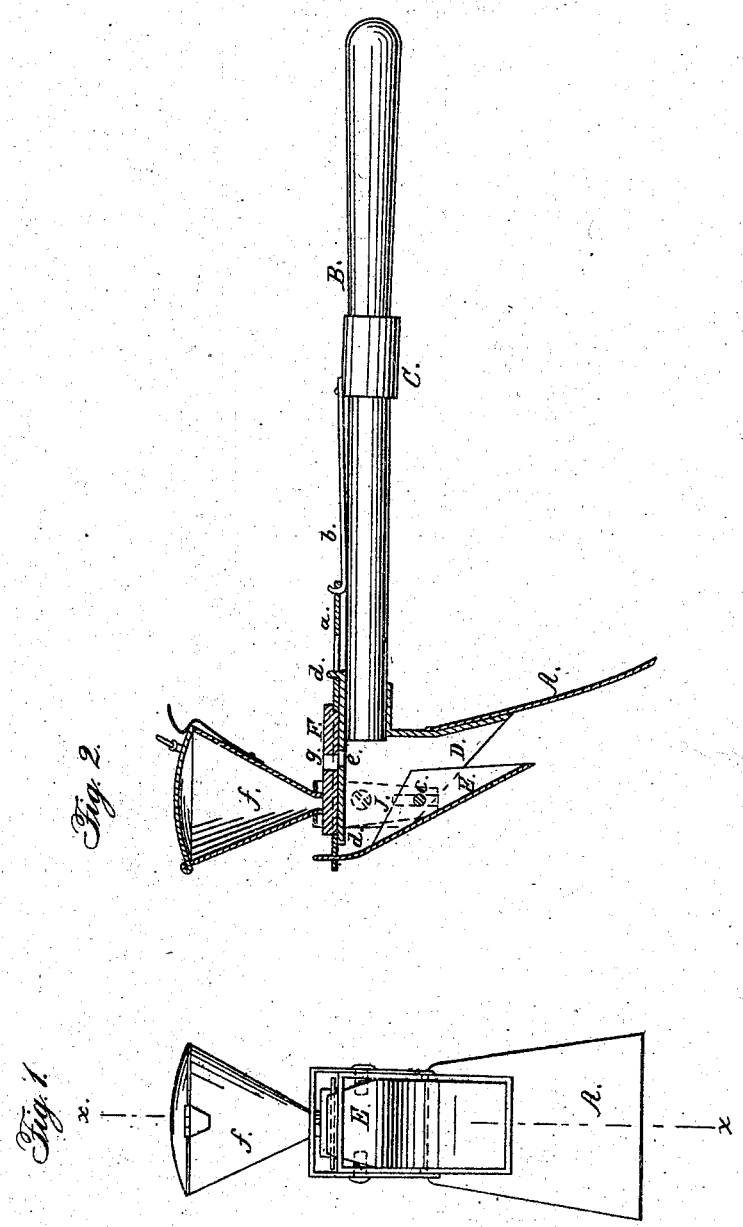
Witnesses:
Theo. Tusche.
Wm. Prewin.
Inventor:
Augustus Williams
Munn & Co.
Attorneys.

United States Patent Office.

AUGUSTUS WILLIAMS, OF SEBEC, MAINE.

Letters Patent No. 66,196, dated June 25, 1867.

---

PLANTING-HOE.

---

The Schedule referred to in these Letters Patent and making part of the same.

---

TO ALL WHOM IT MAY CONCERN:

Be it known that I, AUGUSTUS WILLIAMS, of Sebec, in the county of Piscataquis, and State of Maine, have invented a new and useful improvement in Planting-Hoe; and I do hereby declare that the following is a full, clear, and exact description thereof, which will enable others skilled in the art to make and use the same, reference being had to the accompanying drawings forming part of this specification.

This invention relates to a new and improved method of depositing seeds in the ground, and covering the same; and the invention consists in constructing a hoe, and attaching to it an apparatus whereby the necessary orifice is made in the ground, and the seed dropped and covered at one and the same operation.

Figure 1 represents an end view of the planting apparatus which is attached to the hoe.

Figure 2 is a side view of the whole implement, it being a vertical section through the line $x$ $x$ of fig. 1.

Similar letters of reference indicate like parts.

A represents the blade of the hoe; B is the hoe-handle; C is a sliding sleeve on the handle. This sleeve is attached to a sliding-plate, $a$, by the rod $b$. D and E form a triangular-shaped box on the back of the hoe. E is pivoted to D at $c$, and, being actuated by the sliding-plate $a$, through which the top of it passes, as seen in fig. 2, it is opened and closed at the bottom end as the slide is drawn back and forth. $d$ is a fixed plate, forming the top of the box, but having an aperture through it for the passage of the seed. This aperture is seen at $e$. F is a block which is loosely attached to the sliding-plate $a$, having an aperture through it for the passage of the seed. This block, of course, slides with the plate $a$ on the fixed plate $d$. $f$ is the hopper. The plate $a$ and the block F are moved back and forth over the fixed plate $d$. The aperture through the block F, marked $g$, is brought under the hopper, and filled with seed when the sleeve C is pushed forward. When the sleeve is brought back, or moved in the other direction, the holes $g$ through the block, and the hole $e$ through the fixed plate $d$, will be brought together, and the seed will drop down into the box D, and behind the blade of the hoe, as seen in the drawing.

In operating the hoe, the handle B is held in one hand, and the sleeve C is moved back and forth by the other.

The hopper is attached to an adjustable yoke, J, which is fastened by a screw to the sides of the box D. This adjustability allows the block F to be of any required thickness. The thickness of the block governs the quantity of seed dropped; and the blocks may be changed to suit the quantity of seed which it is desired to drop in a hill. The manner of operating the hoe will at once be understood from the drawing.

What I claim as new, and desire to secure by Letters Patent, is—

A planting-hoe, composed of the parts herein shown and described, when combined and arranged to operate substantially as and for the purposes set forth.

AUGUSTUS WILLIAMS.

Witnesses:
 EDWARD ROBINSON,
 THEO. WYMAN.